(12) United States Patent
Dasgupta et al.

(10) Patent No.: US 11,010,223 B2
(45) Date of Patent: May 18, 2021

(54) METHOD AND SYSTEM OF AUTOMATIC EVENT AND ERROR CORRELATION FROM LOG DATA

(71) Applicant: Infosys Limited, Bangalore (IN)

(72) Inventors: Sudipto Shankar Dasgupta, Sunnyvale, CA (US); Mayoor Rao, Sunnyvale, CA (US); Ganapathy Subramanian, Sunnyvale, CA (US)

(73) Assignee: Infosys Limited, Bangalore (IN)

( * ) Notice: Subject to any disclaimer, the term of this patent is extended or adjusted under 35 U.S.C. 154(b) by 553 days.

(21) Appl. No.: 15/823,259

(22) Filed: Nov. 27, 2017

(65) Prior Publication Data
US 2019/0073257 A1 Mar. 7, 2019

(30) Foreign Application Priority Data
Sep. 1, 2017 (IN) .............................. 201741031072

(51) Int. Cl.
*G06F 11/07* (2006.01)
*G06F 11/34* (2006.01)
*G06F 16/25* (2019.01)

(52) U.S. Cl.
CPC ...... *G06F 11/0754* (2013.01); *G06F 11/0709* (2013.01); *G06F 11/3452* (2013.01); *G06F 16/258* (2019.01); *G06F 11/079* (2013.01); *G06F 11/0766* (2013.01); *G06F 2201/81* (2013.01); *G06F 2201/86* (2013.01)

(58) Field of Classification Search
CPC .............. G06F 11/0754; G06F 16/258; G06F 11/0709; G06F 11/3452
See application file for complete search history.

(56) References Cited

U.S. PATENT DOCUMENTS 6,405,329 B1 * 6/2002 Colligan ................ G11B 20/10
714/36
6,578,160 B1 * 6/2003 MacHardy, Jr. .... G06F 11/0709
709/223

(Continued)

OTHER PUBLICATIONS

Liu et al., "Management of Flexible Schema Data in RDBMSs—Opportunities and Limitations for NoSQL-," 7th Biennial Conference on Innovative Data Systems Research (CIDR '15), Jan. 4-7, 2015, Asilomar, CA, 9 pages.

(Continued)

*Primary Examiner* — Matthew M Kim
*Assistant Examiner* — Indranil Chowdhury
(74) *Attorney, Agent, or Firm* — Troutman Pepper Hamilton Sanders LLP (Rochester)

(57) ABSTRACT

A method and system can implement error and event log correlation in an apparatus and include extracting one or more log information associated with a storage location and creating a flexible structure of the one or more log information. The one or more log information is translated to a database store based on a user input. A match level is determined between an event and error data through the one or more log information extracted. When the match level exceeds a predetermined value, a relationship between the event and error data is created through an algorithm and a shareable entry is created for the relationship in a format usable by another apparatus.

16 Claims, 6 Drawing Sheets

(56) References Cited

U.S. PATENT DOCUMENTS

| | | | | |
|---|---|---|---|---|
| 7,818,418 | B2* | 10/2010 | Bansal | H04L 43/06 |
| | | | | 709/224 |
| 8,386,848 | B2* | 2/2013 | Grell | G06N 5/045 |
| | | | | 714/25 |
| 10,565,045 | B2* | 2/2020 | Kirshenbaum | G06F 11/079 |
| 2007/0028220 | A1* | 2/2007 | Miller | G05B 23/0278 |
| | | | | 717/124 |
| 2008/0168242 | A1* | 7/2008 | Eberbach | G06F 11/0778 |
| | | | | 711/161 |
| 2009/0183023 | A1* | 7/2009 | Rathunde | G06F 11/0709 |
| | | | | 714/4.2 |
| 2010/0223499 | A1* | 9/2010 | Panigrahy | G06F 11/0709 |
| | | | | 714/19 |
| 2012/0166869 | A1* | 6/2012 | Young | G06F 11/0721 |
| | | | | 714/15 |
| 2014/0279834 | A1* | 9/2014 | Tsirogiannis | G06F 16/86 |
| | | | | 707/602 |
| 2015/0347923 | A1* | 12/2015 | Bartley | G06F 11/079 |
| | | | | 706/12 |
| 2017/0013003 | A1* | 1/2017 | Samuni | H04L 63/1425 |
| 2017/0242773 | A1* | 8/2017 | Cirne | G06F 11/079 |
| 2017/0318036 | A1* | 11/2017 | Movsisyan | H04L 63/1425 |
| 2019/0097873 | A1* | 3/2019 | Nucci | H04L 43/02 |
| 2019/0182101 | A1* | 6/2019 | Kulshreshtha | H04L 41/0631 |
| 2019/0227860 | A1* | 7/2019 | Gefen | G06F 11/0709 |
| 2020/0042426 | A1* | 2/2020 | Ambichl | G06F 16/9024 |

OTHER PUBLICATIONS

Galindo, "Schema Flexibility on SAP HANA—In a nutshell," blogs.sap.com, Jun. 6, 2013, 10 pages.

* cited by examiner

METHOD AND SYSTEM OF AUTOMATIC EVENT AND ERROR CORRELATION FROM LOG DATA

FIELD OF TECHNOLOGY

The present disclosure relates to methods and systems for automated anomaly detection, more particularly, for anomaly detection through error and event log correlation.

BACKGROUND

Log analysis has long been a key tool for system administrators to observe, learn and automate their environments. With growth in data and computing needs, the volume of the logs have vastly increased, and the scale of performing analysis becomes more difficult to get timely, useful and clear data and appropriate triggers for enabling automation using traditional tools. The log files contain a multitude of information. The log files may bring together insights which include: frequency of information, issues logged, events, alerts, anomalies, etc. Discovering correlations between multiple sources may be complex and time consuming. However, the benefits of such correlations may help in root cause analysis, discovering event flows, and determining the behavior-based connections that exist within complex system environments.

In the information technology (IT) landscape and support services, proactive monitoring and maintenance adds to benefits and cost savings. In the case of incident monitoring, alerting from complex machine-generated logs may be critical for such success and savings. Machine logs and error logs may be complex and are difficult to analyze manually. Different IT systems may have different error logs and event logs formats. In a heterogenic landscape with multiple systems where most of them may be connected for a business program monitoring. Proactive identification and remedy of a situation helps business benefit.

With IT landscape evolving and businesses adopting multitude of systems and software which may be interconnected and derive business outcomes, managing such systems, software becomes complex. Preventive and proactive maintenance may be pervasive to avert business loss and cost savings as such.

Distributed applications and services by their nature may be complex pieces of software that comprise many moving parts. In a production environment, it is important to be able to track a system, trace resources, utilization of resources, and proactively monitor the health and performance of the system. System performance may depends on a number of factors. Each factor may typically be measured through key performance indicators (KPIs), such as the number of database transactions per second and/or the volume of network requests that are successfully serviced in a specified time frame. Some of these KPIs might be available as specific performance measures, whereas others might be derived from a combination of metrics.

In any case, determining poor and/or good performance may require a detailed understanding of the level of performance at which the system should be capable of running and thus requiring observing the system while the system is functioning under a typical load and capturing the data for each KPI over a period of time—given the complex landscape, manual gathering of such information and monitoring, managing, reporting, remedying real-time on a production environment may be impossible without automation. Dynamically adjusting the level of detail for performance monitoring process may require higher level support operations to provide quick insights in real-time and to remedy the system issues.

SUMMARY

Disclosed are a method and/or a system for anomaly detection through error and event log correlation.

In one aspect, a method of error and event log correlation in an apparatus, the method comprises extracting one or more log information associated with a storage location and creating a flexible structure of the one or more log information. The one or more log information is translated to a database store based on a user input. A match level is determined between an event and error data through the one or more log information extracted. When the match level exceeds a predetermined value, a relationship between the event and error data is created through an algorithm and a shareable entry is created for the relationship in a format usable by another apparatus.

In another aspect, an apparatus of error and event log correlation comprises one or more distributed processors, an event logger, an event translator, an incidence element, an analysis element, a downstream element, a computer network, one or more storage locations and one or more log information associated with the event logger. The one or more log information is extracted over the computer network from one or more of an application and a system through one or more distributed processors. The one or more log information is translated and formatted to a predetermined format through the event translator. A match level is determined through the one or more log information extracted between an event and an error data through the incidence element. When the match level exceeds a predetermined value, a relationship is created between the event and error data through an automatically selected algorithm associated with the analysis element. A correlation is created by the incidence element through the match level and the correlation is persisted in a format usable by another apparatus through the downstream element.

In yet another aspect, a system of error and event log correlation comprises a computer network, a storage location, and one or more log information associated with the storage location. The one or more log information is extracted over the computer network and a flexible structure of the at least one log information is created. The one or more log information is translated to a database store based on a user input and a match level is determined through the one or more log information extracted between an event and an error data. When the match level exceeds a predetermined value, a relationship is created between the event and error data through an algorithm. A shareable entry is created for the relationship in a format usable by another apparatus.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of the present invention are illustrated by way of example and not as limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, an apparatus and/or a system of anomaly detection through error and event log correlation. Although the present embodiments have been described with reference to specific example embodiments, it will be evident that various modifications and changes may be made to these embodiments without departing from the broader spirit and scope of the various embodiments.

Figure 1:
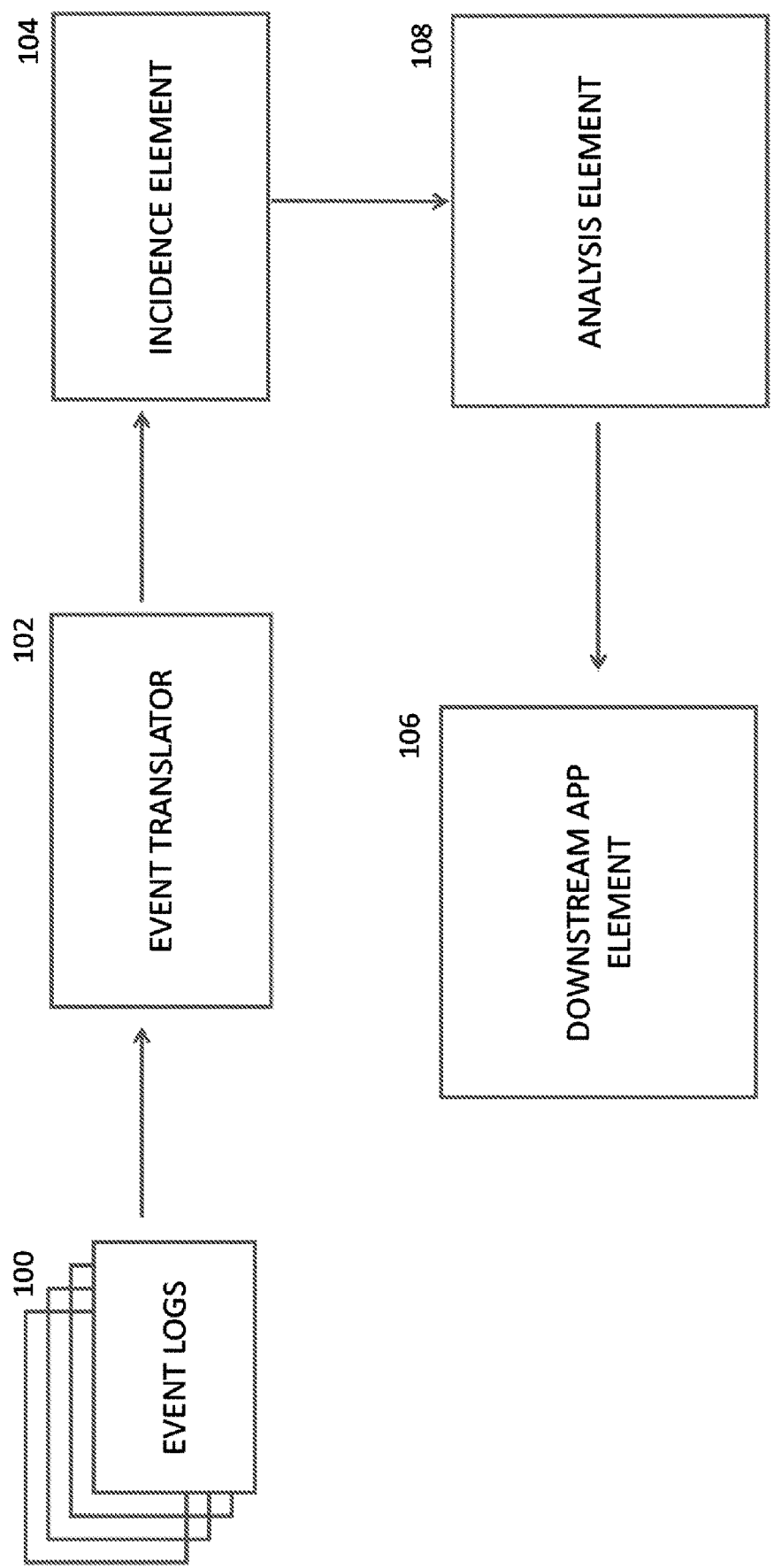
FIG. 1 illustrates a system of error and event log correlation, according to one embodiment.

FIG. 1 illustrates a system of error and event log correlation, according to one or more embodiments.

In one or more embodiments, event logs 100 may enable to extract and store information from files into a specified database store of user choice. The event translator 102 may make the log information available for processing by translating logs to a flexible schema. Incidence element 104 may determine correlation from the information extracted between the events (example—alerts, anomalies, errors) with the log data.

Analysis element 108 may create a match between the translated log data and an error. Further, the analysis element 108 may build a relationship between the log data and the error by means of an automated choice of an algorithm and/or threshold data Downstream app element 106 may persist the information extracted. The information may contain deterministically correlated event data against the log data. Further the information may be available for consumption to business intelligence applications at a user end.

In one or more embodiments, event correlation mining process may be applied to multiple data sources to automatically detect and pull out correlations between two events given that the event occur close in time and the events an overlap of similar features. Each event may have a set of features associated with the event. The closeness in time may be predetermined time interval and/or a time interval specified by a user. A log trace entries in a system log may correlate to each other to derive metrics, otherwise the log trace may need to be manually parsed and connected by an administrator and/or analyst. In more complex situations correlating events across data sources may discover behaviors that cascade between systems.

In one or more embodiments, a set of mathematical techniques may be applied to indicate the strength of links using an overlap of features and timestamps. The mathematical techniques may be one of selected by a user and/or automatically selected. Strength values may also be combined with statistics to keep track of a probability of occurrence for any link discovered between data sources. Correlating information across multiple data sources may be important because it detects those complex application behaviors, aids root-cause analysis and uncover previously unknown behaviors. Cross data correlation may uncover anomalies and the unknown behaviors may be indicative of a threat and/or an error in an application as the application logs information. Cross data correlation may be done by comparing newly discovered information against patterns present within an overall behavior seen in the past.

Identifying correlations may be made more meaningful. Finding links in log data across multiple systems may be complicated. Furthermore, there may be a strength metric associated with the events which may not be easily arrived at by only scrutinizing log files. Many times, the individual system administrators perform manual searches, timestamp checks, and event overlaps. The event correlation process described herein may be applied to multiple data sources to automatically detect and pull out correlations between two events given that the events occur close in time and have an overlap of similar features. Certain log trace entries may find an overlap of events (time and feature based) and may affect strength of a detected correlation and thus determine its importance. In one or more embodiments, a database store may be a repository for persistently storing and managing collections of data.

In one or more embodiments, in more complex situations, discovering correlating events across data sources may also uncover behavior that cascades between systems and sources. By applying a right algorithm, the strength of links using an overlap of events and log data may be indicated. The algorithm may be chosen based on a number of criteria including but not limited to correlation between events, strength of relationship, user selection, etc., The strength values may also be combined with statistics to keep track of a probability of occurrence for any link discovered between data sources. Correlating information across multiple data sources may be important because the correlating information detects those complex application behaviors, aids root-cause analysis and may uncover previously unknown behaviors. Cross data correlation may uncover those anomalies and unknown behaviors may be indicative of a threat and/or an error in an application as the application logs information. Clearly, there is a need in the art for advancement in correlation capabilities and also in specifically automating the process, and removing manual intervention for creating flexible schema and performing event to log correlation analysis. The method, system and apparatus described herein discloses advanced processing inclusive of algorithm selection and application that reduces the overall effort and increases the overall correlation analysis consumable by any IT system.

Figure 2:
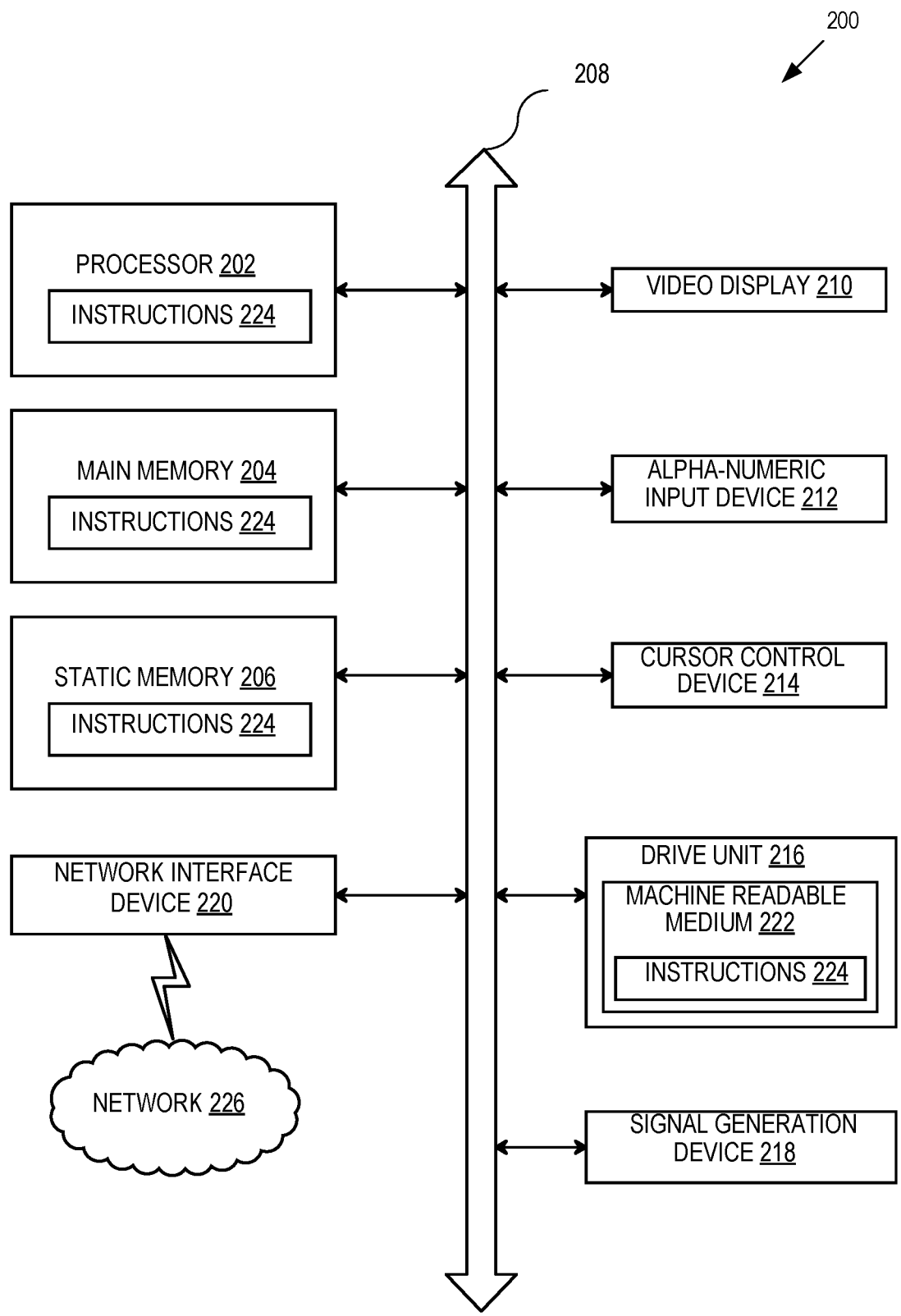
FIG. 2 is a diagrammatic representation of a data processing system capable of processing a set of instructions to perform any one or more of the methodologies herein, according to one embodiment.

FIG. 2 is a diagrammatic representation of a data processing system capable of processing a set of instructions to perform any one or more of the methodologies herein, according to an example embodiment. FIG. 2 shows a diagrammatic representation of machine in the example form of a computer system 200 within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or a client machine in server-client network environment, and or as a peer machine in a peer-to-peer (or distributed) network environment. The machine may be a personal—computer (PC), a tablet PC, a cellular telephone, a web appliance, a network router, switch and or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system includes a processor 202 (e.g., a central processing unit (CPU) a graphics processing unit (GPU) and/or both), a main memory 204 and a static memory 206, which communicate with each other via a bus 208. The computer system 200 may further include a video display unit 210 (e.g., a liquid crystal displays (LCD) and/or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions 224 (e.g., software) embodying any one or more of the methodologies and/or functions described herein. The instructions 224 may also reside, completely and/or at least partially, within the main memory 204 and/or within the processor 202 during execution thereof by the computer system 200, the main memory 204 and the processor 202 also constituting machine-readable media.

The instructions 224 may further be transmitted and/or received over a network 226 via the network interface device 220. While the machine-readable medium 222 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and the like. The term "machine-readable medium" does not refer to signals.

Figure 3:
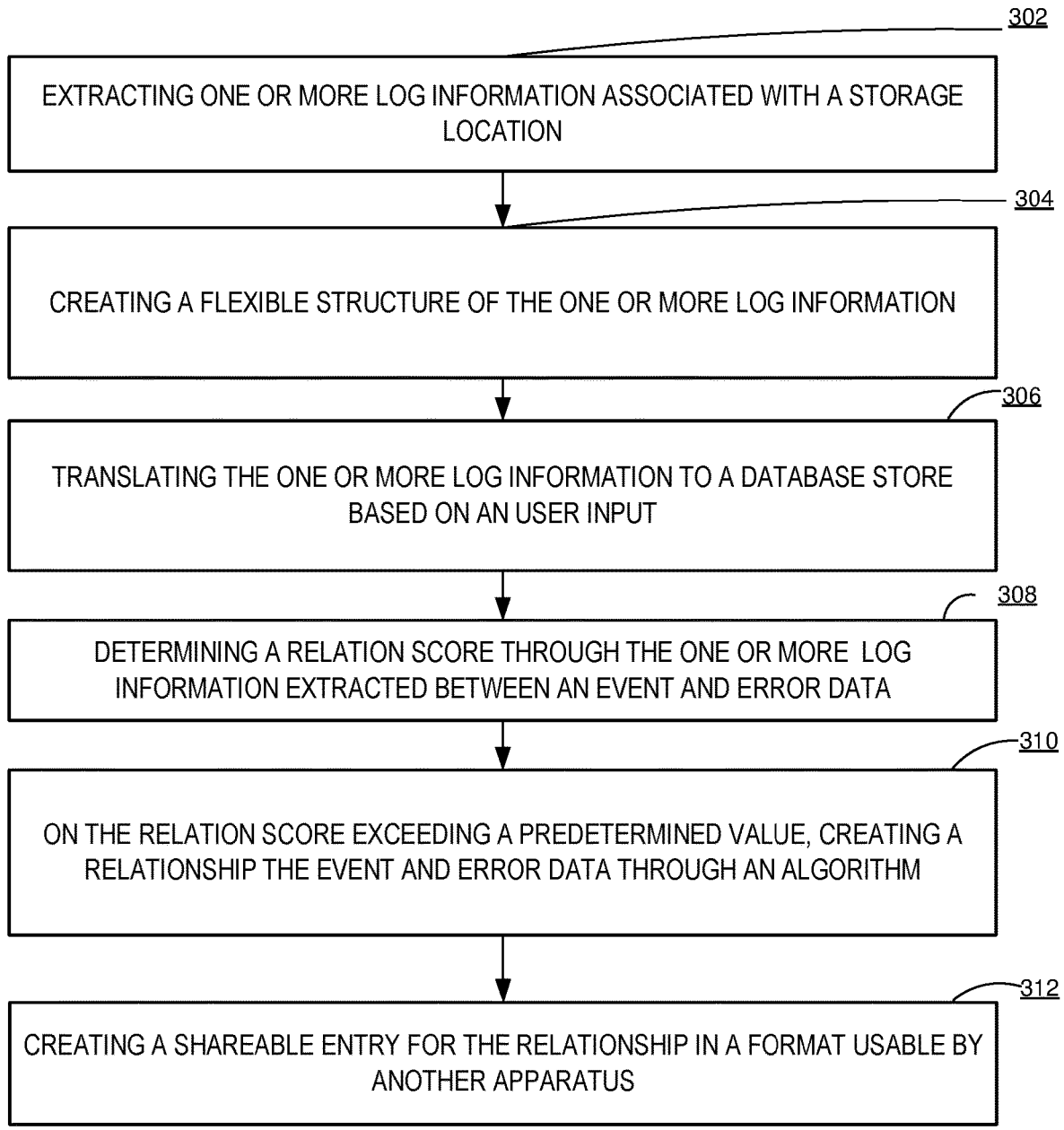
FIG. 3 is a process flow diagram detailing the operations of a method to correlate error and event log data.

FIG. 3, is a process flow diagram detailing the operations of a method of error and event log correlation in an apparatus, the method comprises extracting one or more log information associated with a storage location 302 and creating a flexible structure of the one or more log information 304. The flexible structure may be referred to as a flexible schema.

In one or more embodiments, a major part of any relational database may be the schema. The schema may be a structure of data as defined by tables and columns in a relational database. In a flexible schema it may be possible to change the schema whenever necessary. However, at any given time, each table may have a set number of columns, each with a specific name and datatype.

The one or more log information is translated to a database store based on a user input 306. A match level or relation score may be determined between an event and error data through the one or more log information extracted 308. When the match level exceeds a predetermined value, a relationship between the event and error data is created through an algorithm 310 and a shareable entry is created for the relationship in a format usable by another apparatus 312. The predetermined value may be a threshold.

The match level may be referred to also as a relation score. The match level may be determined by a combination of various factors including but not limited to overlap between the event and error data, timestamp associated with the event and error data, system associated with the event data and system associated with the error data.

In an example embodiment, a match level between event data 1 and error data 1 may be forty five percent (45%) and a threshold may be defined at fifty percent (50%). The match level has not exceeded the defined threshold. Hence, a relationship is not created between event data 1 and error data 1.

In an another example embodiment, a match level between event data 2 and error data 2 may be sixty five percent (65%) and a threshold may be defined at Fifty percent (50%). The match level has exceeded the defined threshold. Hence, a relationship is created between event data 2 and error data 2.

Figure 4:
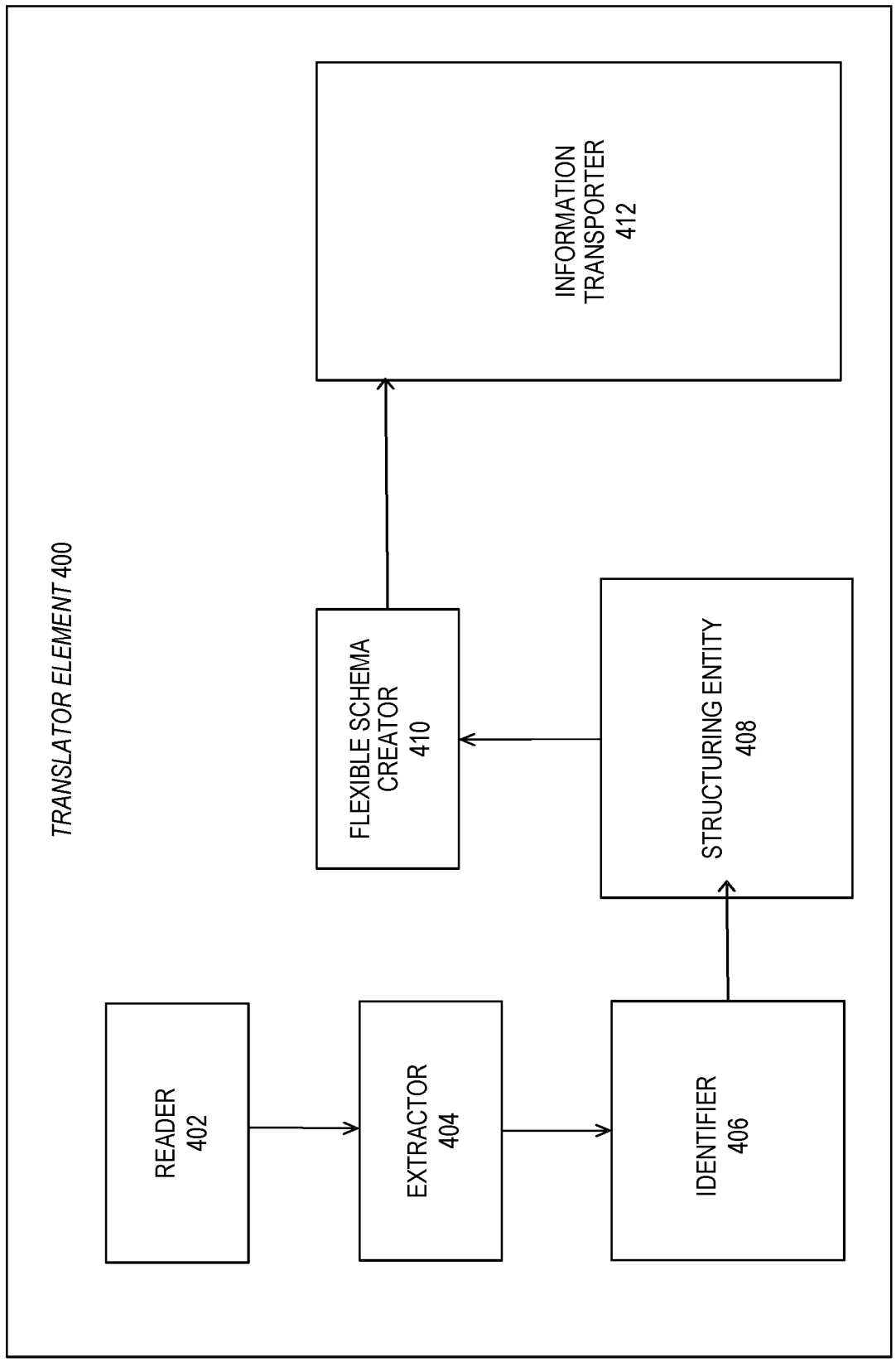
FIG. 4 illustrates a translator element, according to one embodiment.

FIG. 4 illustrates a translator element, according to one embodiment. The translator element 400 includes a reader 402, extractor 404, identifier 406, structuring entity 408, flexible schema creator 410, and information transporter 412.

The reader 402 may read may read log files in various formats such as CSV, TXT, JSON, REGEX etc. The extractor 404 may extract event and log data in association with the read log files of the reader 402. The identifier 406 may identify event names, event codes and/or time logs. The structuring entity 408 may create process blocks of information. The process blocks of information may be converted into a structured format and/or may be converted to a user configurable entity. The flexible schema creator 410 then creates a flexible schema. The information transporter 412 may move information from a User Specified Data-store such as HDFS, Hive, Cassandra, Postgres, HBase etc., to a configurable output table schema.

Figure 5:
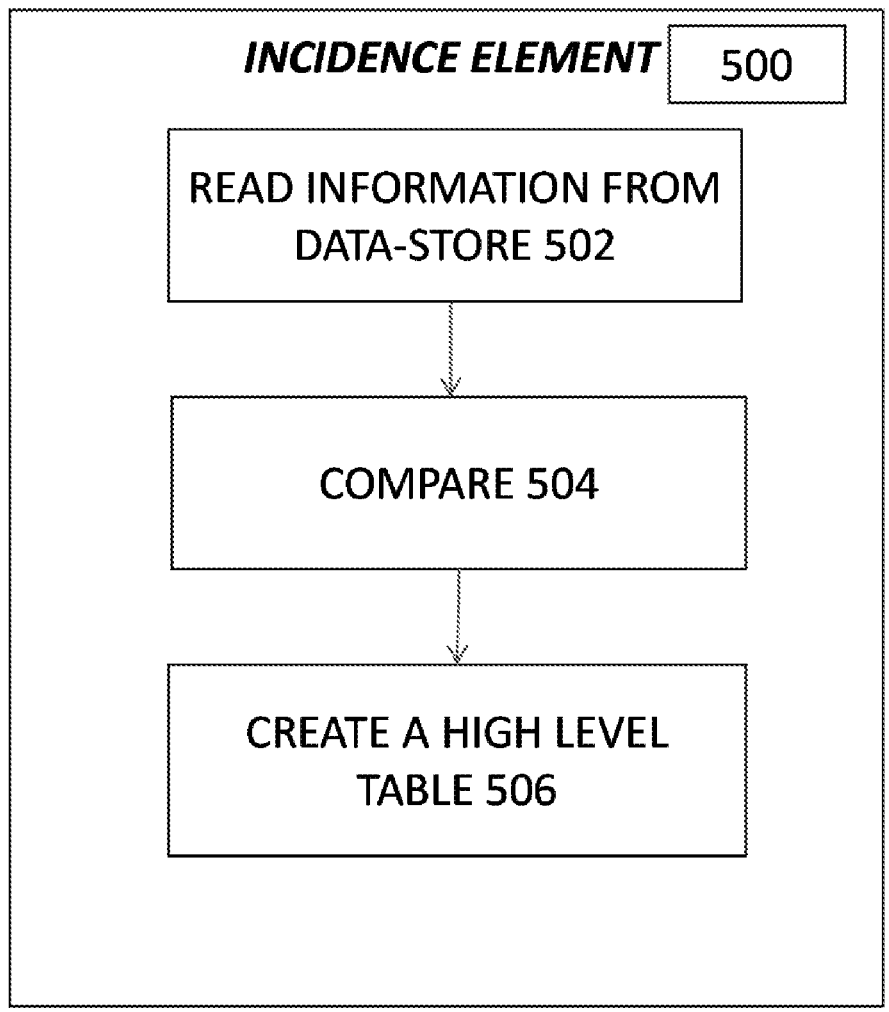
FIG. 5 illustrates an incidence element, according to one embodiment.

FIG. 5 illustrates an incidence element, according to one embodiment. The incidence element 500 includes read-information from data-store element 502, comparison element 504, and a create high level table element 506. The read information from data-store element 502 may feed the read data into the comparison element 504. The comparison element 504 may compare the event logs against events on an application versus events on a system. The comparison element 504 may use key performance indicators as a workflow definition. The create high level table element 506 may create a high level table with information correlations ready for analytics and further analysis by third party applications.

Figure 6:
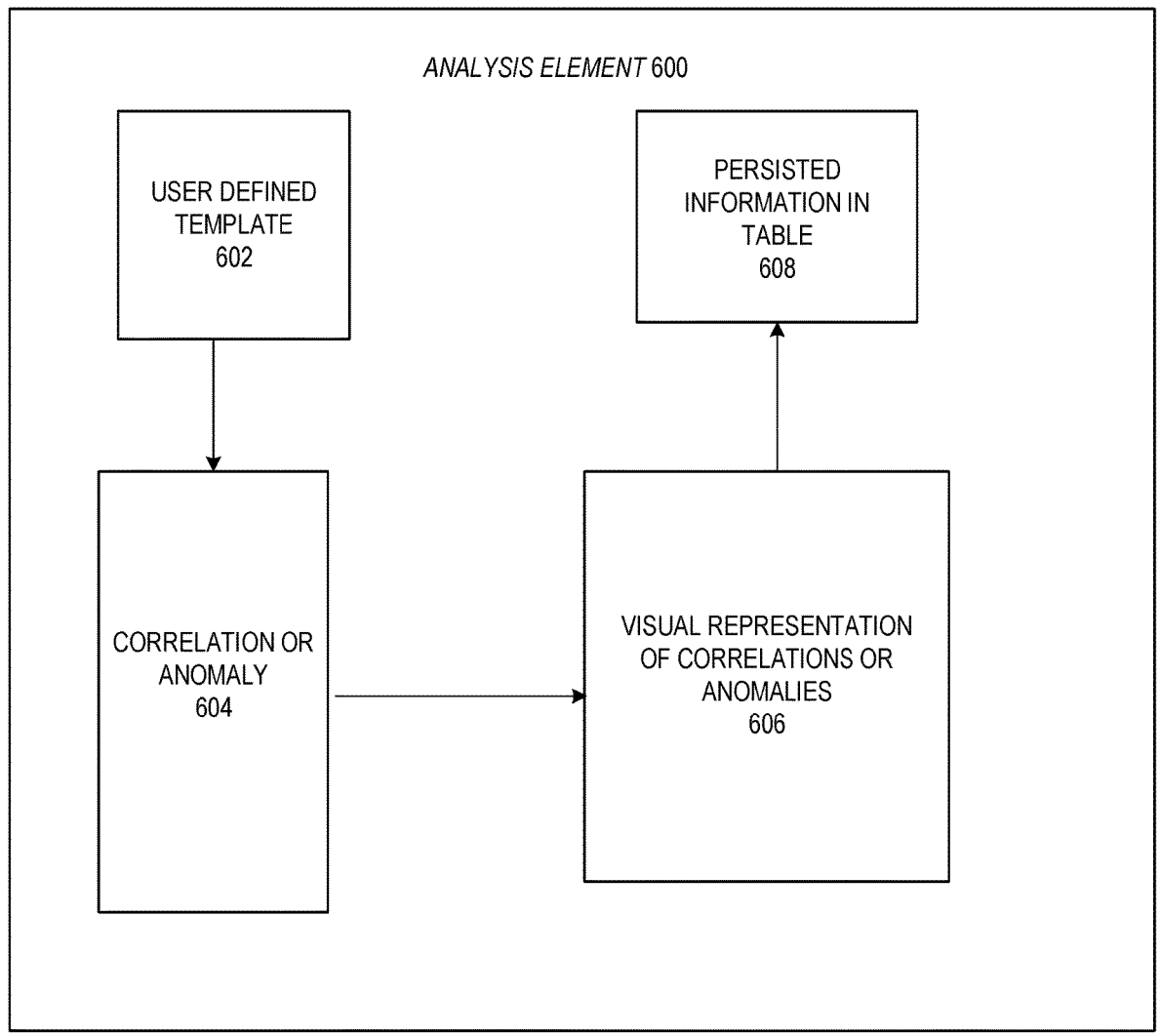
FIG. 6 illustrates an analysis element, according to one embodiment.

FIG. 6 illustrates an analysis element, according to one embodiment. The analysis element 600 may include user defined template 602, correlation or anomaly 604, visual representations of correlations or anomalies 606 and persisted information in table 608. The user defined user template 602 may be a configurable user defined template for analysis. The correlation or anomaly element 604 may be used for correlation or anomaly (Events to Errors) analysis, algorithm selection and running the algorithm.

In one or more embodiments, information collected from log data and other sources may be used to determine an algorithm that effectively monitors symptoms associated with respect to problem isolation.

The visual representations of correlations or anomalies 606 may include visual representation of correlations and/or anomalies between different error types. The visual representations may be based on incidence percentage.

In one or more embodiments, detection and identification of unique events in IT landscape may be treated as a process issue. More specifically, event correlation (correlating observed events to unique events) may be split into two separate activities: (1) generating efficient snippets (sets of symptom events) for problem identification, and (2) decoding the issue log. Detection and identification of problems in the system may be done efficiently because (1) stale and inept data is eliminated during issue and/or problem identification stage, leaving a sparse data to be analyzed during the decoding phase, and (2) comparing issues against identified indicators is of minimal effort with process automation.

In one or more embodiments, a method of error and event log correlation may include five-step process, translation of logs to a flexible schema, use of the translation definition to extract and store the information from log files to database store, finding correlations between the events that are logged in different log files using the information extracted, automatically detect an algorithm and thresholds to find the correlation, persist the information extracted which may be consumed by any BI application.

In one or more embodiments, the method and apparatus provides an end to end framework for using machine-compliable language process event information, error logs based on casualty data available. Captured information may then be used to determine an algorithm using which symptoms can be most effectively monitored with respect to problem isolation. The persisted information will further increase the efficiency of correlations.

In one or more embodiments, a method and apparatus may specify, detect and identify unique events (such as events, or issues) in an Information Technology (IT) Landscape having evident symptoms. Although many of the examples contained herein may relate to the IT landscape, it is expressly understood that such examples do not in any way limit the scope of the invention. Event correlations for the various fields may function simultaneously and interrelate to derive correlations. The steps in the claims should not be considered limiting a particular order in which they are practiced.

In one or more embodiments, an apparatus of error and event log correlation comprises one or more distributed processors, an event logger, an event translator, an incidence element, an analysis element, a downstream element, a computer network, one or more storage locations and one or more log information associated with the event logger. The one or more log information is extracted over the computer network from one or more of an application and a system through one or more distributed processors.

The one or more log information is translated and formatted to a predetermined format through the event translator. A match level is determined through the one or more log information extracted between an event and an error data through the incidence element. When the match level exceeds a predetermined value, a relationship is created between the event and error data through an automatically selected algorithm associated with the analysis element. A correlation is created by the incidence element through the match level and the correlation is persisted in a format usable by another apparatus through the downstream element.

In one or more embodiments, the one or more log information is associated with a timestamp and the timestamp is associated with a time at which an event occurred.

In one or more embodiments, translating the one or more log information includes extracting the one or more log information in a format and writing in another format. An anomaly is the relationship between the event and error data created through the automatically selected algorithm. The created shareable entry for the relationship is in a format usable by another apparatus is a flexible schema. The one or more distributed processors collect the one or more log information associated with the one or more storage locations.

In one or more embodiments, a system of error and event log correlation comprises a computer network, a storage location, and one or more log information associated with the storage location. The one or more log information is extracted over the computer network and a flexible structure of the at least one log information is created. The one or more log information is translated to a database store based on a user input and a match level is determined through the one or more log information extracted between an event and an error data. When the match level exceeds a predetermined value, a relationship is created between the event and error data through an algorithm. A shareable entry is created for the relationship in a format usable by another apparatus.

The one or more log information may be associated with a timestamp. Further, translating the one or more log information may be include extracting the one or more log information in a format and writing in another format. The timestamp may be associated with a time at which an event occurred. An anomaly may be the relationship between the event and error data created through an algorithm. An algorithm may be selected automatically to create the relationship between the event and the error data on the match level exceeding a predetermined value. The created shareable entry for the relationship may be in a format usable by another apparatus is flexible schema.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). The medium may be, for example, a memory, a transportable medium such as a CD, a DVD, a Blu-ray™ disc, a floppy disk, or a diskette. A computer program embodying the aspects of the exemplary embodiments may be loaded onto the retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Moreover, as disclosed herein, the term "computer-readable medium" includes, but is not limited to portable or fixed storage devices, optical storage devices and various other mediums capable of storing, or containing data.

Accordingly, the specification and drawings are to be regarded in an illustrative rather than a restrictive sense.

What is claimed is:

1. A method of error and event correlation in an apparatus, the method comprising:
   extracting at least one log information associated with a storage location, the at least one log information indicating events in an information technology landscape having symptoms;
   creating a flexible schema of the at least one log information indicating events in an information technology landscape having symptoms;
   translating the at least one log information indicating events in an information technology landscape having symptoms to a database store based on a user input, wherein the database store is of the flexible schema;
   determining a match level through the at least one extracted log information between an event and error data;
   on the match level exceeding a predetermined value, creating a relationship between the event and the error data through an algorithm, wherein the algorithm effectively monitors symptoms associated with respect to problem isolation and is automatically selected based on the at least one log information indicating the events in the information technology landscape having symptoms;
   creating a shareable entry for the relationship between the event and the error data in a format usable by another apparatus, wherein the format of the shareable entry for the relationship between the event and the error data is the flexible schema.

2. The method of claim 1, wherein the at least one log information is associated with a timestamp.

3. The method of claim 1, wherein translating the at least one log information includes extracting the at least one log information in a format and writing in another format.

4. The method of claim 2, wherein the timestamp is associated with a time at which an event occurred.

5. The method of claim 1, wherein an anomaly is the relationship between the event and the error data created through an algorithm.

6. The method of claim 1, wherein:
   the algorithm is selected automatically to create the relationship between the event and the error data on the match level exceeding a predetermined values;
   the automatically selected algorithm is chosen based on correlation between events and strength values combined with statistics; and
   correlating events across data sources are discovered to uncover behavior that cascades between systems and sources.

7. A system of error and event correlation, the system comprising:
   a computer network;
   a storage location;
   at least one log information associated with the storage location,
   wherein the at least one log information is extracted over the computer network, the at least one log information indicating events in an information technology landscape having symptoms;
   wherein a flexible structure of the at least one log information indicating events in an information technology landscape having symptoms is created;
   wherein the at least one log information indicating events in an information technology landscape having symptoms is translated to a database store based on a user input;
   wherein a match level is determined through the at least one extracted log information between an event and an error data;
   wherein when the match level exceeds a predetermined value, a relationship is created between the event and the error data through an algorithm, wherein the algorithm effectively monitors symptoms associated with respect to problem isolation and is automatically selected based on the at least one log information indicating the events in the information technology landscape having symptoms; and
   wherein a shareable entry is created for the relationship between the event and the error data in a format usable by another apparatus, wherein the format of the shareable entry for the relationship between the event and the error data is a flexible schema.

8. The system of claim 7, wherein the at least one log information is associated with a timestamp.

9. The system of claim 8, wherein the timestamp is associated with a time at which an event occurred.

10. The system of claim 7, wherein translating the at least one log information includes extracting the at least one log information in a format and writing in another format.

11. The system of claim 7, wherein an anomaly is the relationship between the event and the error data created through an algorithm.

12. The system of claim 7, wherein the algorithm is selected automatically to create the relationship between the event and the error data on the match level exceeding a predetermined value.

13. An apparatus of error and event correlation, the apparatus comprising:
   one or more distributed processors;
   an event logger;
   an event translator;
   an incidence element;
   an analysis element;
   a downstream element;
   a computer network;
   one or more storage locations; and
   at least one log information associated with the event logger,
   wherein the at least one log information is extracted over the computer network from at least one of an application and a system through one or more distributed processors, the at least one log information indicating events in an information technology landscape having symptoms;
   wherein the at least one log information indicating events in an information technology landscape having symptoms is translated and formatted to a predetermined format through the event translator, process blocks of information are created, and the process blocks of information are converted into a structured format;

wherein a match level is determined through the at least one extracted log information between an event and an error data through the incidence element;

wherein when the match level exceeds a predetermined value, a relationship is created between the event and the error data through an automatically selected algorithm associated with the analysis element, wherein the algorithm effectively monitors symptoms associated with respect to problem isolation and is automatically selected based on the at least one log information indicating the events in the information technology landscape having symptoms, wherein a correlation is created by the incidence element through the match level; and wherein the correlation is persisted in a format usable by another apparatus through the downstream element, wherein a created shareable entry for the relationship between the event and the error data is in a format usable by another apparatus, and the format of the shareable entry for the relationship between the event and the error data is a flexible schema;

wherein correlating events across data sources are discovered to uncover behavior that cascades between systems and sources, and the automatically selected algorithm is chosen based on correlation between events and strength values combined with statistics; and wherein an anomaly is the relationship between the event and the error data created through the automatically selected algorithm.

14. The apparatus of claim 13, wherein the at least one log information is associated with a timestamp and wherein the timestamp is associated with a time at which an event occurred.

15. The apparatus of claim 13, wherein translating the at least one log information includes extracting the at least one log information in a format and writing in another format.

16. The apparatus of claim 13, the one or more distributed processors collect the at least one log information associated with the one or more storage locations.

* * * * *